United States Patent
Vollmer

(10) Patent No.: US 10,399,431 B2
(45) Date of Patent: Sep. 3, 2019

(54) HYBRID DRIVE AND OPERATING METHOD FOR A HYBRID DRIVE

(71) Applicant: AUDI AG, Ingolstadt (DE)

(72) Inventor: Frank Vollmer, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 34 days.

(21) Appl. No.: 15/562,423

(22) PCT Filed: Apr. 4, 2016

(86) PCT No.: PCT/EP2016/000552
§ 371 (c)(1),
(2) Date: Sep. 28, 2017

(87) PCT Pub. No.: WO2016/162117
PCT Pub. Date: Oct. 13, 2016

(65) Prior Publication Data
US 2018/0281581 A1    Oct. 4, 2018

(30) Foreign Application Priority Data

Apr. 4, 2015  (DE) ................ 10 2015 004 467

(51) Int. Cl.
*B60K 6/48* (2007.10)
*B60W 20/00* (2016.01)
(Continued)

(52) U.S. Cl.
CPC .............. *B60K 6/48* (2013.01); *B60K 6/365* (2013.01); *B60K 6/387* (2013.01); *B60K 6/547* (2013.01);
(Continued)

(58) Field of Classification Search
CPC .......... B60K 6/48; B60K 6/365; B60K 6/387; B60K 6/547; B60K 2006/381;
(Continued)

(56) References Cited

U.S. PATENT DOCUMENTS 8,480,525 B2 *  7/2013  Reichert ................. B60K 6/40
                                                             475/5
8,978,516 B2 *  3/2015  Funk ....................... B60K 6/36
                                                             74/665 A
(Continued)

FOREIGN PATENT DOCUMENTS

CN      101896391 A    11/2010
DE    102009046366 A1    5/2011
(Continued)

OTHER PUBLICATIONS

Notification of Transmittal of Translation of the International Preliminary Report on Patentability dated Oct. 19, 2017, in connection with corresponding international application No. PCT/EP2016/000552 (10 pages).

(Continued)

*Primary Examiner* — John D Walters
(74) *Attorney, Agent, or Firm* — Maier & Maier, PLLC

(57) ABSTRACT

Hybrid drive for a motor vehicle including an internal combustion engine, an electric engine and an output shaft. The hybrid drive is designed as a parallel hybrid and provided with at least one operating state, in which both the internal combustion engine and the electric engine are coupled to the output shaft. Between the internal combustion engine and the electric engine is arranged a shifting element, which can be operated either connected in a first shifting position, in which the electric engine is connected to the output shaft and the internal combustion engine is decoupled, or in a second shifting position, in which both the electric engine and the internal combustion engine are connected to the output shaft.

10 Claims, 1 Drawing Sheet

(51) Int. Cl.
  *B60K 6/365*  (2007.10)
  *B60K 6/387*  (2007.10)
  *B60W 20/40*  (2016.01)
  *B60K 6/547*  (2007.10)
  *B60K 6/38*  (2007.10)

(52) U.S. Cl.
  CPC ....... *B60W 20/40* (2013.01); *B60K 2006/381* (2013.01); *B60K 2006/4841* (2013.01); *B60Y 2200/92* (2013.01); *B60Y 2400/73* (2013.01); *Y02T 10/6221* (2013.01); *Y10S 903/91* (2013.01); *Y10S 903/919* (2013.01)

(58) Field of Classification Search
  CPC ........... B60K 2006/4841; B60K 6/356; B60W 20/40; B60Y 2200/92; B60Y 2400/73; Y02T 10/6221; Y10S 903/91; Y10S 903/919
  USPC ..................................................... 180/65.25
  See application file for complete search history.

(56) References Cited

U.S. PATENT DOCUMENTS 9,002,553 B2 * 4/2015 Kamoshida .............. B60K 6/36
  701/22

2010/0200319 A1  8/2010  Tanba et al.
2011/0040432 A1  2/2011  Kaltenbach et al.
2012/0116629 A1  5/2012  Kamoshida et al.

FOREIGN PATENT DOCUMENTS

| | | |
|---|---|---|
| DE | 102010063092 A1 | 6/2011 |
| DE | 102010053846 A1 | 6/2012 |
| DE | 112010003346 T5 | 7/2012 |
| DE | 102011003830 A1 | 8/2012 |
| DE | 102013222609 A1 | 5/2014 |
| DE | 102013210010 A1 | 6/2014 |
| DE | 102013206176 A1 | 10/2014 |
| DE | 102013213951 A1 | 1/2015 |
| DE | 102013214950 A1 | 2/2015 |
| JP | H10291421 A | 11/1998 |

OTHER PUBLICATIONS

Examination Report dated Dec. 11, 2015 of corresponding German application No. 10 2015 004 467.2; 8 pgs.
International Search Report dated Jun. 13, 2016 of corresponding International application No. PCT/EP2016/000552; 16 pgs.
Office Action dated Feb. 19, 2019 in corresponding Chinese Application No. 201680020496.6; 16 pages.

* cited by examiner

HYBRID DRIVE AND OPERATING METHOD FOR A HYBRID DRIVE

FIELD

The invention relates to a hybrid drive for a motor vehicle, comprising an internal combustion engine, an electric engine and an output shaft, wherein the hybrid drive is constructed as a parallel hybrid and comprises at least one operating state in which both the internal combustion engine and the electric engine are coupled to the output shaft.

BACKGROUND

A similar hybrid drive can be configured for example in a P2 arrangement, wherein the electric engine is arranged between the internal combustion engine and the transmission. The coupling or decoupling of the internal combustion engine is carried out by actuating a shiftable clutch. The starting operation can be carried out with such a hybrid drive both by means of the electric engine and also by means of the internal combustion engine. With conventional hybrid drives, the transmission is usually designed as an automatic transmission that is provided with a relatively large number of gears. For example, the automatic transmission can be provided with eight gears, which results in a high manufacturing cost.

SUMMARY OF THE DISCLOSURE

The invention is therefore based on the idea to specify a hybrid drive that has a simple construction and results in a low manufacturing cost.

In order to solve this task with a hybrid drive of the type mentioned above according to the invention, a shifting element is arranged between the internal combustion engine and the electric engine, which can be operated either in the first shifting position, in which the electric engine is connected to the drive shaft and the internal combustion engine is decoupled, or it can be operated in a second shifting position, in which both the electric engine and also the internal combustion engine are connected to the drive shaft, wherein between the electric engine and the output shaft is arranged a shiftable transmission enabling a different number of gears for the internal combustion engine and for the electric engine.

It is preferred when different power flows are associated with the internal combustion engine and with the electric engine. The hybrid drive according to the invention has the advantage that in comparison to a conventional multi-stage automatic transmission, only one simplified transmission is required. In addition to the advantage of a lower manufacturing cost, another advantage is that the shiftable transmission required a smaller installation space. The hybrid drive according to the invention makes it possible to assign different numbers of gears to the internal combustion engine and to the electric engine, wherein preferably one gear is assigned to the internal combustion engine, and more gears, preferably two or three gears, are assigned to the electric engine. In contrast to that, conventional hybrid drives are usually constructed in such a way that the internal combustion engine and the electric engine are mutually connected via a common shaft, wherein for example the internal combustion engine can be selectively decoupled.

It is advantageous when the start-up operation of a motor vehicle, which is equipped with the hybrid drive according to the invention, can be started in the first gear, so that the shifting element is in the first gear. In this shifting position, the internal combustion engine is decoupled. The purely electric start-up operation in the forward gear can take place both in the forward gear and in the reverse gear. After starting in the forward gear, the shifting element can be moved at a certain point into the second gear, so that the second gear of the transmission is connected for the electric engine. In this second gear, in addition to the electric engine, the internal combustion engine is also connected to the output shaft so that both drives are switched on.

This means that during a shifting operation when switching from the first shifting position of the shifting element into the second shifting position of the shifting element, a second gear of the transmission can be switched on for the electric engine and the internal combustion engine can be switched on at the same time so that it is started. Accordingly, with a switching operation of the shifting element from the second shifting position back to the first shifting position, a first gear of the transmission can be switched on for the electric engine and the internal combustion engine can be decoupled at the same time, so that it is switched off. In this manner, the hybrid drive is set up such that the internal combustion engine is simultaneously started with a switching operation from the first shifting position to the second shifting position of the shifting element, and so that it is stopped with a switching operation from the second shifting position to the first shifting position. Accordingly, the hybrid drive according to the invention is adapted to shift at the same time a gear of the transmission to an electric engine, to start the internal combustion engine, or to stop or and/or to decouple the internal combustion engine. The shifting element thus combines or effects a switching function and a coupling function.

With the hybrid drive according to the invention it is preferably provided that to the first shifting position of the shifting element is assigned the first gear of the transmission and to the second shifting position of the shifting element is assigned the second gear of the transmission, wherein the shifting element is designed in such a way that the corresponding gear is engaged during the switching of the shifting element. The shifting of both gears is thus carried out by actuating the shifting element and the a brake is actuated (released) at the same time. The internal combustion engine is coupled or decoupled with an actuation of the shifting element. The electric machine is shifted during the switching of the shifting element from the first gear to the second gear, or from the first gear to the second gear. In the coupled state, both the internal combustion engine and the electric engine are synchronized with each other.

With the hybrid drive according to the invention it is particularly preferred when the transmission is designed for the electric engine as a planetary gearbox. Such a planetary gearbox, which preferably has two gears, namely two different transmission ratios, requires only a small installation space.

With the hybrid drive according to the invention, it can be provided that the planetary gearbox is coupled to the output shaft when the second gear is engaged.

It is also within the scope of this invention that the internal combustion engine of the hybrid drive according to the invention is connected to a flywheel, in particular to a dual-mass flywheel.

The flywheel acts as a damper, so that disturbances such as fluctuations of rotational speed have a less severe impact.

According to another embodiment of the hybrid drive in accordance with the invention, it can be provided that the output shaft is equipped with a separating element for selective coupling or decoupling of the planetary gearbox. The separating element acts as a clutch so that in certain operating situations, the drive can be fully decoupled. The separating element can be designed for example as a friction clutch.

It is especially particularly preferred when the hybrid drive according to the invention is provided with a control or regulating device, which is designed for actuating the shifting element. The control or regulating device is preferably designed so as to control or regulate the internal combustion engine and/or the electric engine, in particular so that it can be employed to control or regulate the rotational speed of both drives.

The invention in addition also relates to an operating method for a hybrid drive for a motor vehicle comprising an internal combustion engine, an electric engine and a drive shaft, wherein the hybrid drive is designed as a parallel hybrid drive and is operated at least in one operating state, so that both the internal combustion engine and the electric engine are coupled to the output shaft.

The operating method according to the invention is characterized in that between the internal combustion engine and the electric engine is arranged a shifting element, which is either operated in a first shifting position, in which the electric engine is connected in a first transmission state to the output shaft and the internal combustion engine is decoupled, or in a second shifting position, in which both the electric engine and the internal combustion engine are connected to the output shaft, wherein between the electric engine and the output shaft is arranged a different number of gears that can be engaged for the electric engine.

Further embodiment of the operating method are described in the dependent claims.

BRIEF DESCRIPTION OF THE DRAWING

The invention will be next explained based on embodiments with reference to the figures. The figures are schematic illustrations that show the following.

DETAILED DESCRIPTION OF THE DRAWING

Figure 1:
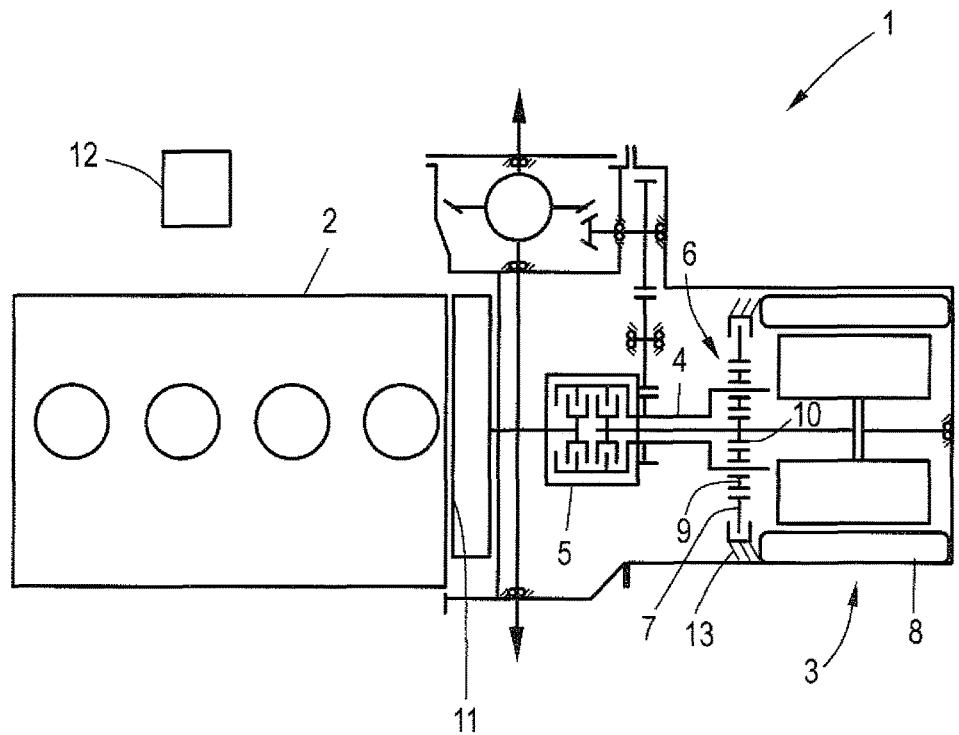
FIG. 1 a first embodiment of a hybrid drive according to the invention.

The hybrid drive shown in FIG. 1 is provided for a motor vehicle and it comprises an internal combustion engine 2 and an electric engine 3, which can be coupled to a drive shaft 4. The hybrid drive 1 is designed as a parallel hybrid and it can be operated in an operating state in which both the internal combustion engine 2 and also the electric engine 3 are connected to the output shaft 4.

Between the internal combustion engine 2 and the electric engine 3 is arranged a shifting element 5, which is provided with two different shifting positions. In a first open shifting position, the electric engine 3 is coupled to the output shaft 4, while the internal combustion engine 2 is decoupled. In a second closed shifting position of the shifting element 5, with a closed brake 13, both the electric machine 3 and the internal combustion engine 2 are coupled to the output shaft 4.

The electric engine 3 is associated with a planetary gearbox 6, which is provided with (only) two gears, which is to say two different gear ratios. In the schematic view of FIG. 1 it can be seen that the planetary gearbox 6 is provided with a ring gear 7 which can be locked by means of a brake 13. The planetary gearbox 6 comprises a plurality of planetary wheels 9, which are distributed over the circumference and coupled in the first shifting position of the shifting element 5 via a planetary gear stage to the output shaft 4.

In addition, the planetary gearbox 6 comprises a sun wheel 10, which is designed, like the ring wheel 7 and the planetary wheel 9, as a toothed wheel. The planetary gearbox is operated in the second position of the shifting element 5 in the block circuit. The two shifting positions correspond to two gears, which is to say to a first gear with a first transmission ratio, and to a second gear with a second transmission ratio. With the operating method for the hybrid drive 1, the first gear of the planetary gearbox is engaged with the shifting of the shifting element 5 to the first shifting position of the first gear. The shifting element 5 is designed in such a way that it operates in a force-fitting manner with a first shifting gear and the first gear or the second gear is switched on in this manner.

When the first gear is switched on, which is to say when the ring gear 7 is braked by the brake 13, the internal combustion engine 2 is decoupled. In order to start the vehicle, the electric engine 3 is shifted to the first gear. Accordingly, the starting of the vehicle is carried out exclusively by means of the electric engine 3, while the internal combustion engine 2 is decoupled. The brake 13 is in this case closed and the ring wheel is stationary. The planetary gear 6 is therefore designed such that a short transmission ratio is provided in the region of the slip limit of the wheels. After a predetermined speed of the vehicle has been reached or after a specified rotational speed of the output shaft 4 has been reached, the shifting element 5 can be actuated so that the second shifting position is entered from the first shifting position which was selected for the starting operation. In the second shifting position, the internal combustion engine and the electric engine are operated in the second gear with a lower operational speed. At the same time, the internal combustion engine is in this case switched on. At the point in time of the shifting operation, the rotation speeds of the internal combustion engine 2 and of the electric engine 3 will be mutually matched via the shifting element.

As one can see from FIG. 1, a flywheel that is configured as a dual-mass flywheel 11 of the internal combustion 2 is used for damping the vibrations. A control or regulating device 12 is schematically illustrated in the figure, which can be also referred to as a controller and which controls or regulates the internal combustion engine 2, as well as the electric engine 3 and the shifting element 5. The resulting output torque can be regulated as needed when the shifting element is switched on by means of the schematically illustrated brake 13, so that internal combustion engine 2 can be connected efficiently.

Figure 2:
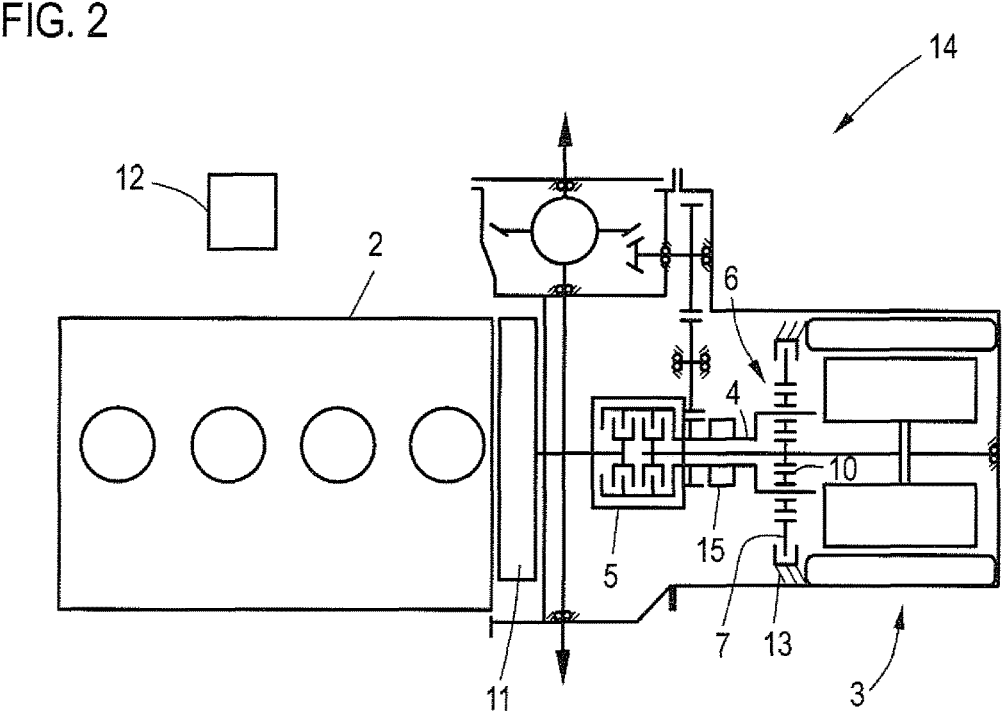
FIG. 2 a second embodiment of the hybrid drive according to the invention.

FIG. 2 shows a second embodiment and shows a hybrid drive 14, which is essentially constructed in the same manner as the hybrid drive shown in FIG. 1. Another explanation of the corresponding components will therefore be omitted here. The hybrid drive 14 comprises an internal combustion engine 2, the electric engine 3 and the shifting element 5. Only the electric engine 3 is coupled to the output shaft 4 in the first operating state. In the second operating state, both the electric engine 3 and the internal combustion engine 2 are coupled to the output shaft 4, wherein the switching between both operating states is carried out by actuating the shifting element 5 and by actuating or releasing the brake 13.

In contrast to the hybrid drive 1, the hybrid drive 14 is provided with a separating element 15, by means of which the connection between the output shaft 4 and the electric engine 3, and when required the internal combustion engine 2, can be selectively coupled or decoupled. The separating element 15 therefore serves as a clutch, which is used to selectively connect or disconnect both drives of the hybrid drive 14 to or from the output shaft 4. The separating element 15 is designed in the illustrated embodiment as a friction clutch.

The two hybrid drives 1, 14 require in each case only a small installation space because the planetary gearbox 6, which is equipped with two gears, has a compact construction, so that thanks to the compact design, the hybrid drives 1, 14 can be manufactured cost-effectively.

The invention claimed is:

1. A hybrid drive for a motor vehicle, comprising:
an internal combustion engine, an electric engine and an output shaft, wherein the hybrid drive is designed as a parallel hybrid and provided with at least one operating state in which both the internal combustion engine and the electric engine are coupled to the output shaft, wherein between the internal combustion engine and the electric engine is arranged a shifting element, which is either connected in a first shifting position in the electric engine to the output shaft and the internal combustion engine is decoupled, or which is operated in a second shifting position in which both the electric engine and the internal combustion engine are connected to the output shaft, wherein between the electric engine and the output shaft is arranged a transmission which enables shifting to the internal combustion engine with a different number of gears and to the electric engine, wherein a control or regulating device is provided, which is designed for actuating the shifting element and for actuating a brake.

2. The hybrid drive according to claim 1, wherein the transmission is designed in such a way that the internal combustion engine can be operated in one gear and the electric engine can be operated in two or three gears.

3. The hybrid drive according to claim 1, wherein a first gear of the transmission is assigned to the first shifting position of the shifting element, and a second gear of the transmission is assigned to the second shifting position of the shifting element, wherein the shifting element is designed in such a way that the corresponding gear can be engaged with the shifting of the shifting element with an activated or deactivated brake.

4. The hybrid drive according to claim 1, wherein the transmission is designed as a planetary gearbox.

5. The hybrid drive according to claim 4, wherein the planetary gearbox is coupled in a block circuit with an engaged second gear to the output shaft.

6. The hybrid drive according to claim 1, wherein the output shaft is provided with a separating element for a selective coupling or decoupling of the planetary gearbox.

7. An operating method for a hybrid drive for a motor vehicle, comprising:
an internal combustion engine, an electric engine and an output shaft, wherein the hybrid drive is configured as a parallel hybrid and operated in at least one operating state, so that both the internal combustion engine and the electric engine are coupled to the output shaft, wherein between the internal combustion engine and the electric machine is arranged a shifting element, which is operated either in a first shifting position, in which the electric engine is connected in a first transmission stage to the output shaft and the internal combustion engine is decoupled, or in a second shifting position, in which both the electric engine and the internal combustion engine are connected to the output shaft, wherein between the electric engine and the output shaft is arranged a switchable gear enabling different numbers of gears for the electric engine, wherein a control or regulating device is provided, which is designed for actuating the shifting element and for actuating a brake.

8. The operating method according to claim 7, wherein a transmission is used which is designed in such a way that the internal combustion engine can be operated in one gear and the electric engine can be operated in two or three gears.

9. The operating method according to claim 7, wherein with the shifting of the shifting element into the first switching position, a first gear of the transmission is engaged, and with the shifting into the second shifting position, the second shifting position of a second gear of the transmission is engaged and the internal combustion engine is preferably started at the same time.

10. The operating method according to claim 7, wherein a planetary gearbox is selectively coupled or decoupled by means of a separating element.

* * * * *